(12) United States Patent
Chuang (10) Patent No.: US 7,677,741 B2
(45) Date of Patent: Mar. 16, 2010

(54) AUXILIARY ACCESSORY FOR A VEHICLE REARVIEW MIRROR

(75) Inventor: Peng-Kai Chuang, Fuxing Hsiang (TW)

(73) Assignee: Ken Sean Factory Co., Ltd., Fuxing Hsiang, Chunghua Hsien (TW)

( * ) Notice: Subject to any disclaimer, the term of this patent is extended or adjusted under 35 U.S.C. 154(b) by 0 days.

(21) Appl. No.: 12/251,355

(22) Filed: Oct. 14, 2008

(65) Prior Publication Data

US 2009/0103198 A1   Apr. 23, 2009

(30) Foreign Application Priority Data

Oct. 17, 2007   (TW) ............................. 96217391 U (51) Int. Cl.
 *B60R 1/08* (2006.01)
(52) U.S. Cl. ................ 359/844; 359/865; 359/872; 248/481
(58) Field of Classification Search ............. 359/844, 359/871, 872, 865; 248/475.1, 481
See application file for complete search history.

(56) References Cited

U.S. PATENT DOCUMENTS

| | | | | |
|---|---|---|---|---|
| 2,636,419 | A | * | 4/1953 | Kerr ............................ 359/850 |
| 3,048,084 | A | * | 8/1962 | Lannuzzi ..................... 359/865 |
| 4,111,532 | A | * | 9/1978 | Budish ........................ 248/481 |
| 4,598,982 | A | * | 7/1986 | Levine ......................... 359/865 |
| 4,863,254 | A | * | 9/1989 | Dyer ............................ 359/850 |
| 4,892,400 | A | * | 1/1990 | Brookes et al. .............. 359/865 |
| 4,892,401 | A | * | 1/1990 | Kittridge et al. ............. 359/850 |
| 4,906,088 | A | * | 3/1990 | Casey .......................... 359/865 |
| 4,921,340 | A | * | 5/1990 | Dyer ............................ 359/864 |
| D329,415 | S | * | 9/1992 | Rhoo ......................... D12/187 |
| 5,296,973 | A | * | 3/1994 | Burke .......................... 359/865 |
| 5,870,236 | A | * | 2/1999 | Barksdale .................... 359/872 |
| 2006/0238906 | A1 | * | 10/2006 | Stonecypher ............... 359/871 |

FOREIGN PATENT DOCUMENTS

| | | | | |
|---|---|---|---|---|
| GB | 2247217 | A | * | 2/1992 |
| KR | 2007119183 | A | * | 12/2007 |
| WO | WO 2007074096 | A1 | * | 7/2007 |

* cited by examiner

*Primary Examiner*—Alessandro Amari
*Assistant Examiner*—Mark Consilvio
(74) *Attorney, Agent, or Firm*—patenttm.us (57) ABSTRACT

An auxiliary accessory for a vehicle rearview mirror having a linking segment with an outer end, a casing formed on the outer end of the linking segment with an outer rim and a mirror mounted in the casing has a cover and an auxiliary mirror assembly. The cover is detachably mounted on the casing of the vehicle rearview mirror and has a body, a mounting gap and multiple retaining tabs. The body has a shape corresponding to the casing of the vehicle rearview mirror and two mounting recesses. The auxiliary mirror assembly is detachably connected to the cover and has an auxiliary mirror mounted in one of the mounting recesses of the body to increase the viewing range of the vehicle rearview mirror.

5 Claims, 8 Drawing Sheets

AUXILIARY ACCESSORY FOR A VEHICLE REARVIEW MIRROR

BACKGROUND OF THE INVENTION

1. Field of the Invention

The present invention relates to an auxiliary accessory, and more particularly to an auxiliary accessory for a vehicle rearview mirror and that can be mounted on the vehicle rearview mirror securely and conveniently.

2. Description of Related Art

Figure 7:
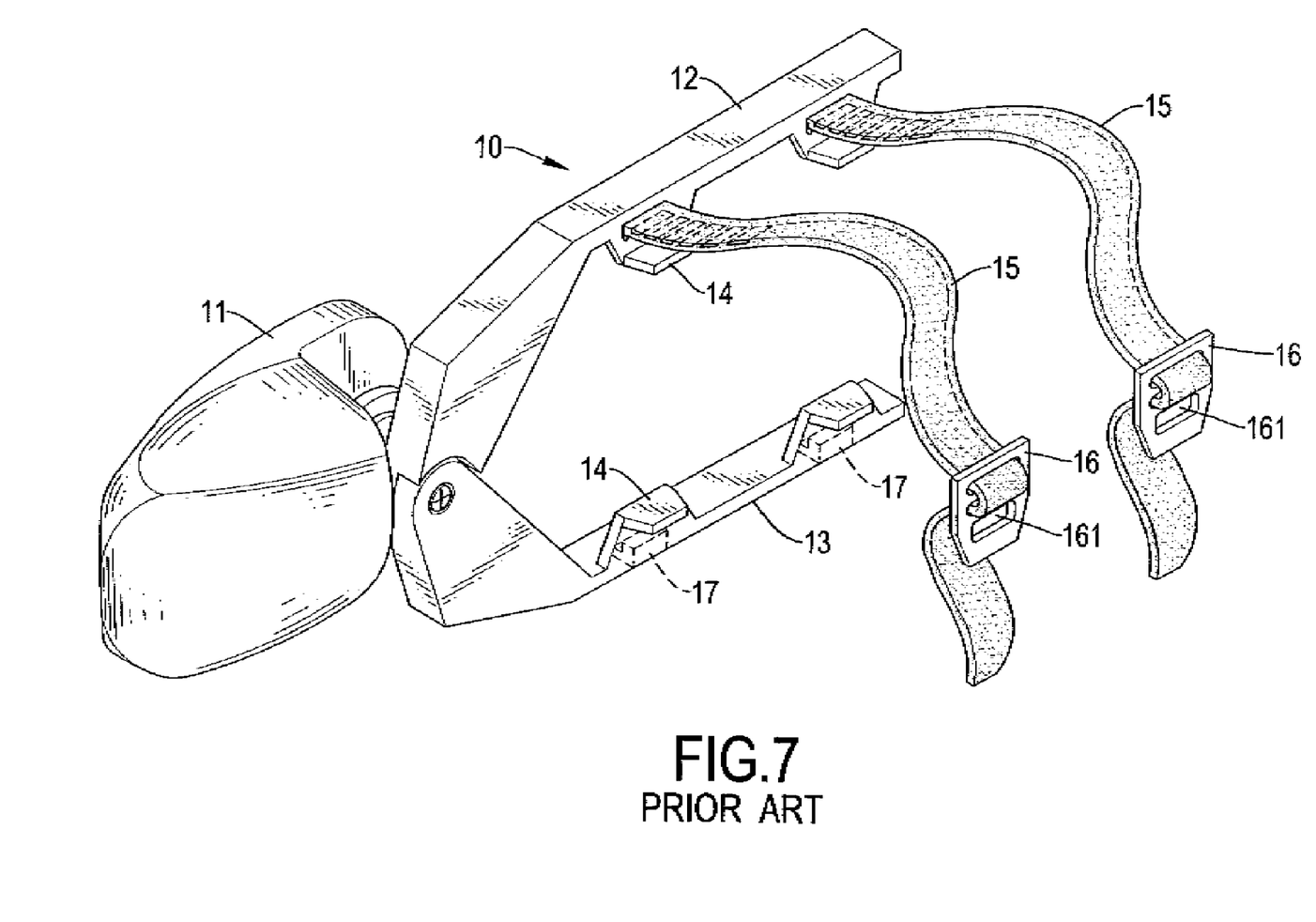
FIG. 7 is a rear perspective view of an auxiliary accessory in accordance with the prior art for being mounted on a vehicle rearview mirror.
Figure 8:
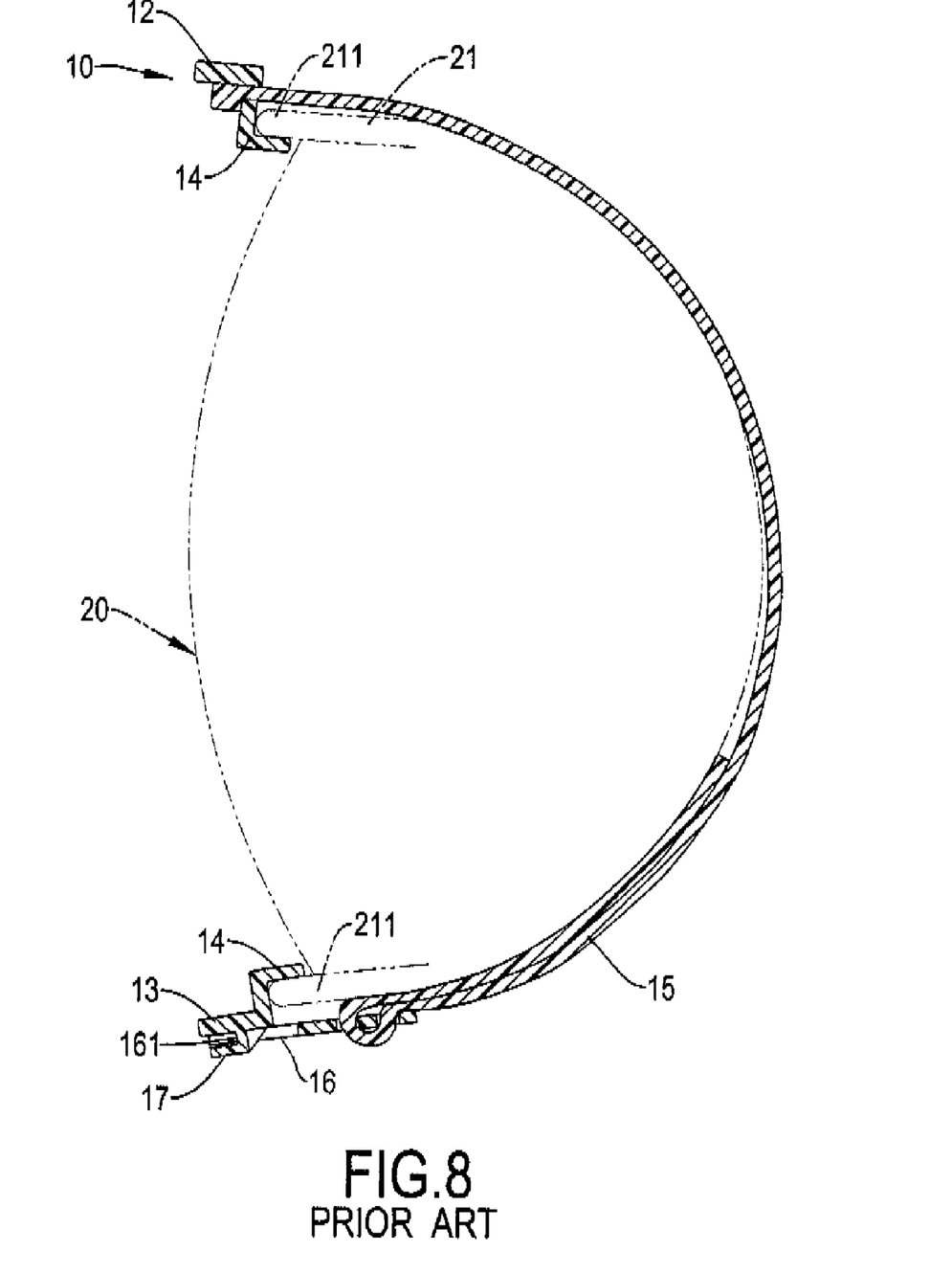
FIG. 8 is an operational side view of the auxiliary accessory in FIG. 7.

With reference to FIGS. 7 and 8, in order to increase the viewing range of a conventional vehicle rearview mirror (20), an auxiliary accessory (10) is detachably mounted on the conventional vehicle rearview mirror (20) having a casing (21) with an annular rim (211) and has two mounting arms (12, 13), multiple retaining panels (14), two holding hooks (17), two tight belts (15), two locking plates (16) and an auxiliary mirror (11).

The mounting arms (12, 13) are connected to each other and are mounted on the vehicle rearview mirror (20), and each mounting arm (12, 13) has a connecting end and a mounting end. The connecting ends of the mounting arms (12, 13) are pivotally connected to each other. The mounting ends of the mounting arms (12, 13) are mounted on the casing (21) of the vehicle rearview mirror (20). The retaining panels (14) may be L-shaped, are formed on the mounting arms (12, 13) and engage the annular rim (211) of the casing (21).

The holding hooks (17) are formed on one of the mounting arms (12, 13) and align respectively with the retaining panels (14). The tight belts (15) are connected to the other mounting arm (12, 13), are mounted around the casing (21) and align respectively with the holding hooks (17). Each tight belt (15) has a free end. The locking plates (16) are respectively mounted on the tight belts (15) near the free ends, and each locking plate (16) has a locking hole (161) formed through the locking plate (16) and connected to the holding hooks (17). The auxiliary mirror (11) is connected pivotally to the connecting ends of the mounting arms (12, 13).

The conventional auxiliary accessory (10) can increase the viewing range of the vehicle rearview mirror (20) when being mounted on the casing (2 1) of the vehicle rearview mirror (20) by connecting the locking plates (16) with the holding hooks (17) on the mounting arms (12, 13). However, when the vehicle is driving on the road, the shaking force of the vehicle will make the conventional auxiliary accessory (10) declining relative to or separating from the casing (21). Then, the user has to adjust the conventional auxiliary accessory (10) to the original position), but this is inconvenient in use.

To overcome the shortcomings, the present invention provides an auxiliary accessory for a vehicle rearview mirror to mitigate or obviate the aforementioned problems.

SUMMARY OF THE INVENTION

The main objective of the present invention is to provide an auxiliary accessory for a vehicle rearview mirror that can mount on the vehicle rearview mirror securely and conveniently.

The auxiliary accessory for a vehicle rearview mirror in accordance with the present invention has a cover and an auxiliary mirror assembly. The cover is detachably mounted on a casing of the vehicle rearview mirror and has a body, a mounting gap and multiple retaining tabs. The body has a shape corresponding to the casing of the vehicle rearview mirror and two mounting recesses. The auxiliary mirror assembly is detachably connected to the cover and has an auxiliary mirror mounted in one of the mounting recesses of the body to increase the viewing range of the vehicle rearview mirror.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 6, an auxiliary accessory (4, 6) in accordance with the present invention is detachably mounted on a vehicle rearview mirror (30) having a linking segment (32), a casing (31) and a mirror (33) and comprises a cover (40, 60), an auxiliary mirror assembly (50) and at least one clamping device (70).

The linking segment (32) of the vehicle rearview mirror (30) is formed on the vehicle and has an outer end. The casing (31) is formed on the outer end of the linking segment (32) and has an outer rim. The mirror (33) is mounted in the casing (31).

The cover (40, 60) is detachably mounted on the casing (31) of the vehicle rearview mirror (30) and has a body (41, 61), a mounting gap (44, 64), multiple retaining tabs (45, 46, 47, 65, 66, 67), multiple spacers (48, 68) and an optional through hole (49).

The body (41, 61) has a shaped corresponding to the casing (31) of the vehicle rearview mirror (30) and has a face, a sidewall, a bottom, an inner end, an outer end, an opening, a first mounting recess (421, 621) and a second mounting recess (422, 622). The opening is formed through the face of the body (41, 61). The first mounting recess (421, 621) is defined in the body (41, 61) near the inner end, communicates with the opening and holds the casing (31) of the vehicle rearview mirror (30) inside. The second mounting recess (422, 622) is defined in the body (41, 61) near the outer end and communicates with the opening and the first mounting recess (421, 621).

The mounting gap (44, 64) is formed through the inner end of the body (41, 61), communicates with the first mounting recess (421, 621) and is mounted around the linking segment (32) of the vehicle rearview mirror (30). The retaining tabs (45, 46, 47, 65, 66, 67) are formed on and protrude from the sidewall of the body (41, 61) near the opening around the first mounting recess (421, 621) and the mounting gap (44, 64) and engage the outer rim of the casing (31) of the vehicle rearview mirror (30). The spacers (48, 68) are mounted in the first mounting recess (421, 621) of the body (41, 61). The through hole (49) is formed through the bottom of the body (41) near the outer end and communicates with the second mounting recess (422).

The auxiliary mirror assembly (50) is detachably connected to the cover (40, 60) and may comprise a mounting post (51), a mirror base (53) and an auxiliary mirror (54).

Figure 2:
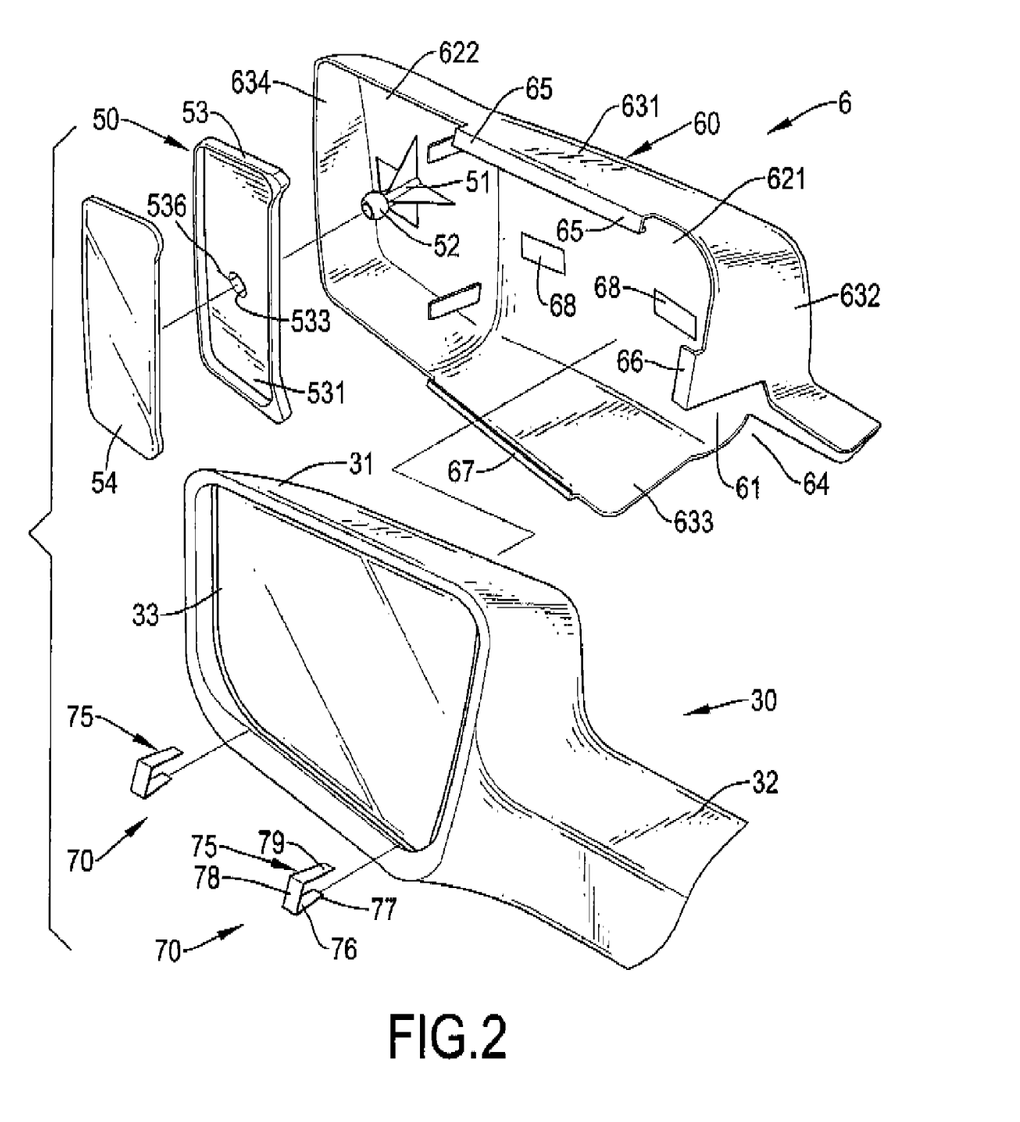
FIG. 2 is an exploded perspective of the auxiliary accessory in FIG. 1.
Figure 3:
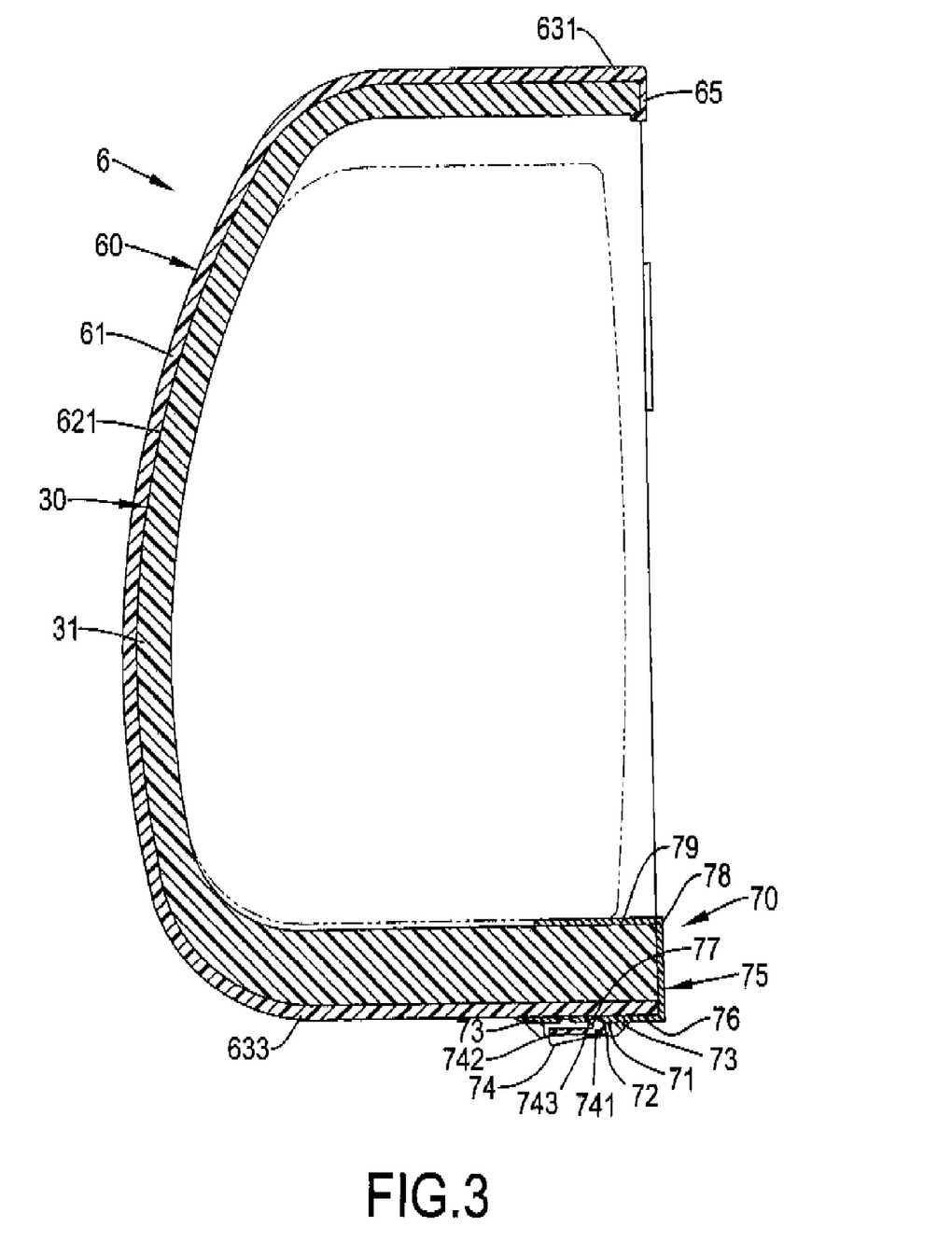
FIG. 3 is a side view in partial section of the auxiliary accessory in FIG. 1.
Figure 5:
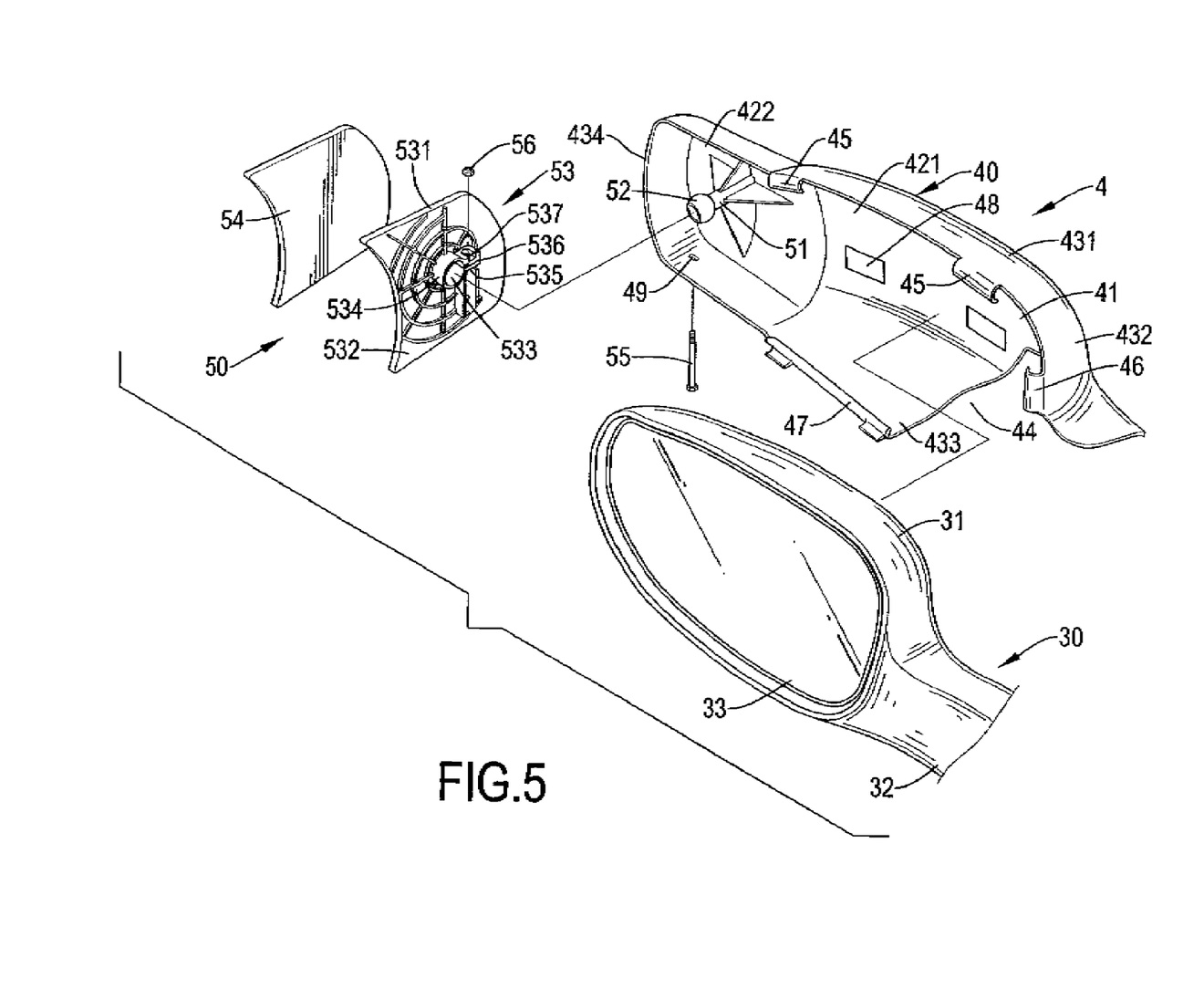
FIG. 5 is an exploded perspective of the auxiliary accessory in FIG. 4.

The mounting post (51) is mounted in the second mounting recess (422, 622) of the body (41, 61) and has a free end and a ball connector (52). The ball connector (52) is formed on the free end of the mounting post (51).

The mirror base (53) is mounted around the mounting post (51) in the second mounting recess (422, 622) of the body (41, 61) and has an inner face (532), an outer face (531), a mounting hole (533), a slit (536), a mounting tube (534), a connecting block (535) and a connecting hole (537). The mounting hole (533) is formed through the faces of the mirror base (53) and is mounted around the ball connector (52) of the mounting post (51). Then, with further reference to FIG. 2, the mirror base (53) of the first embodiment of the present invention can be rotated to an angle relative to the mounting post (51) at a center of the ball connector (52).

The slit (536) is formed through the faces of the mirror base (53) and communicates with the mounting hole (533). The mounting tube (534) is formed on and protrudes from the inner face (532) of the mirror base (53) around the mounting hole (533) to hold the mounting post (51). The connecting block (535) is formed on the inner face (532) of the mirror base (53) and is connected to the mounting tube (534). The connecting hole (537) is formed through the connecting block (535) and aligns with the through hole (49) of the cover (40).

The auxiliary mirror (54) is mounted on the outer face (531) of the mirror base (53) in the second mounting recess (422, 622) of the body (41, 61) to increase the viewing range of the vehicle rearview mirror (30).

With reference to FIG. 5, the auxiliary mirror assembly (50) of the second embodiment of the present invention further has a bolt (55) and a nut (56). The bolt (55) has a free end extended through the through hole (49) and mounted in the connecting hole (537) of the mirror base (53). The nut (56) is screwed with the free end of the bolt (55) and the mirror base (53) of the second embodiment of the present invention can be connected securely with the body (41).

Figure 6:
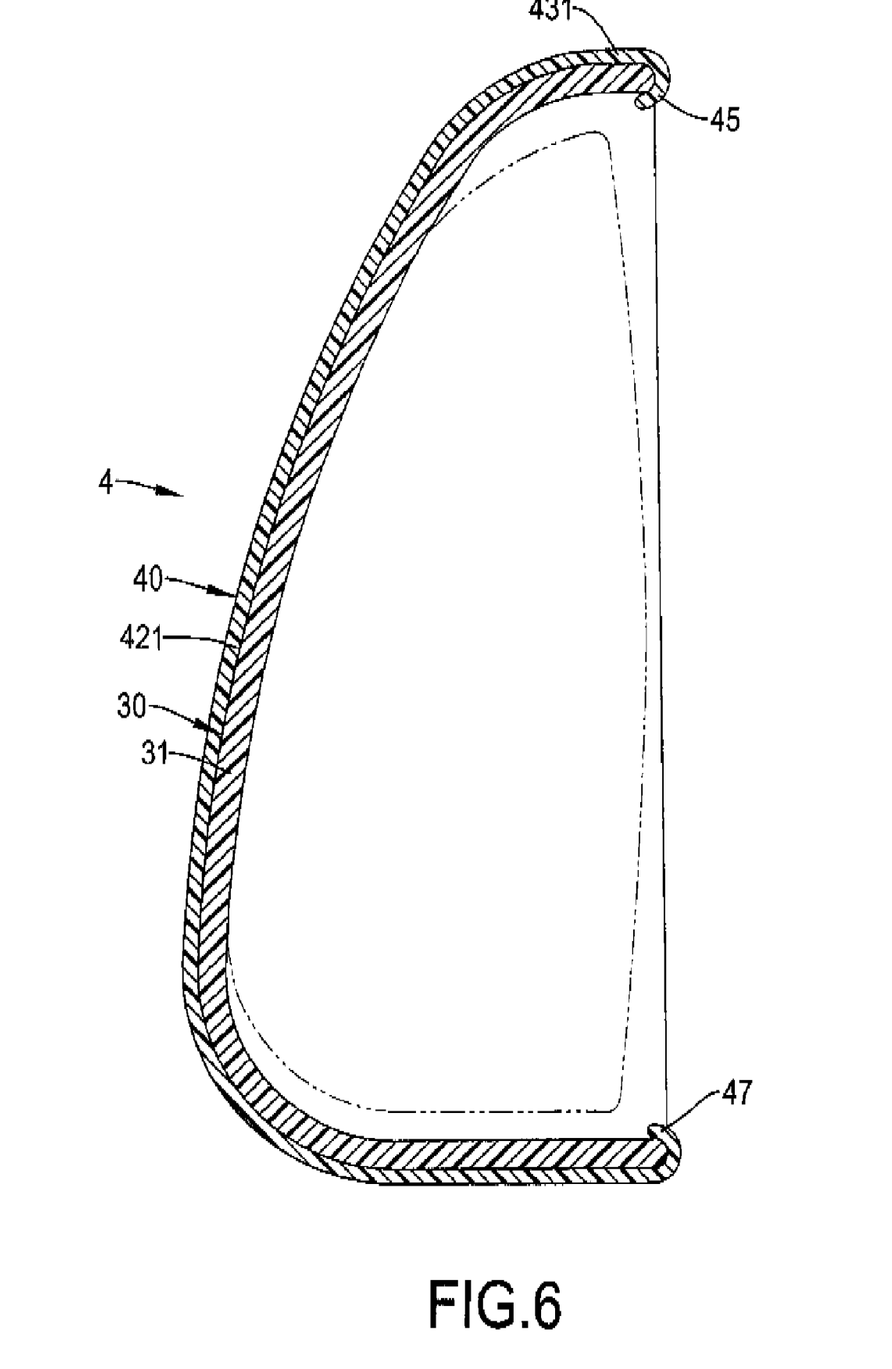
FIG. 6 is a side view in partial section of the auxiliary accessory in FIG. 4.

The at least one clamping device (70) is clamped with the casing (31) of the vehicle rearview mirror (30) and the body (61) of the cover (60) and has a joining mount (71), a control element (74) and a clamping frame (75).

The joining mount (71) is mounted on the bottom of the body (61) near the opening and has a top, a bottom, a joining hole (72) and an inserting hole (73). The top of the joining mount (71) is mounted securely on the bottom of the body (61). The joining hole (72) is formed through the top and the bottom of the joining mount (71). The inserting hole (73) is transversely formed through the joining mount (71) near the top and communicates with the joining hole (72).

The control element (74) is mounted in the joining hole (72) of the joining mount (71) and has an engaging end (741), a pressing end (742) and a holding hook (743). The engaging end (741) of the control element (74) is mounted in the joining hole (72) of the joining mount (71) near the opening of the body (61) and has an inner face. The pressing end (742) of the control element (74) is formed with the engaging end (741) and extends out of the joining hole (72) of the joining mount (71). The holding hook (743) is formed on and protrudes from the inner face of the engaging end (741) of the control element (74).

The clamping frame (75) is U-shaped, is connected to the joining mount (71) to clamp with the casing (31) of the vehicle rearview mirror (30) and has a clamping end (76), a middle (78), a holding end (79) and multiple engaging grooves (77). The clamping end (76) of the clamping frame (75) is inserted into the inserting hole (73) of the joining mount (71) and has a bottom faced to the holding hook (743) of the control element (74). The middle (78) of the clamping frame (75) is formed with the clamping end (76). The holding end (79) of the clamping element (75) is formed with the middle (78) opposite to the clamping end (76) of the clamping frame (75) to press against the casing (31) of the vehicle rearview mirror (30). The engaging grooves (77) are formed in the bottom of the clamping end (76) of the clamping frame (75) in a line, and the holding hook (743) of the control element (74) engages one of the engaging grooves (77) to hold the clamping frame (75) with the casing (31) of the vehicle rearview mirror (30).

Figure 1:
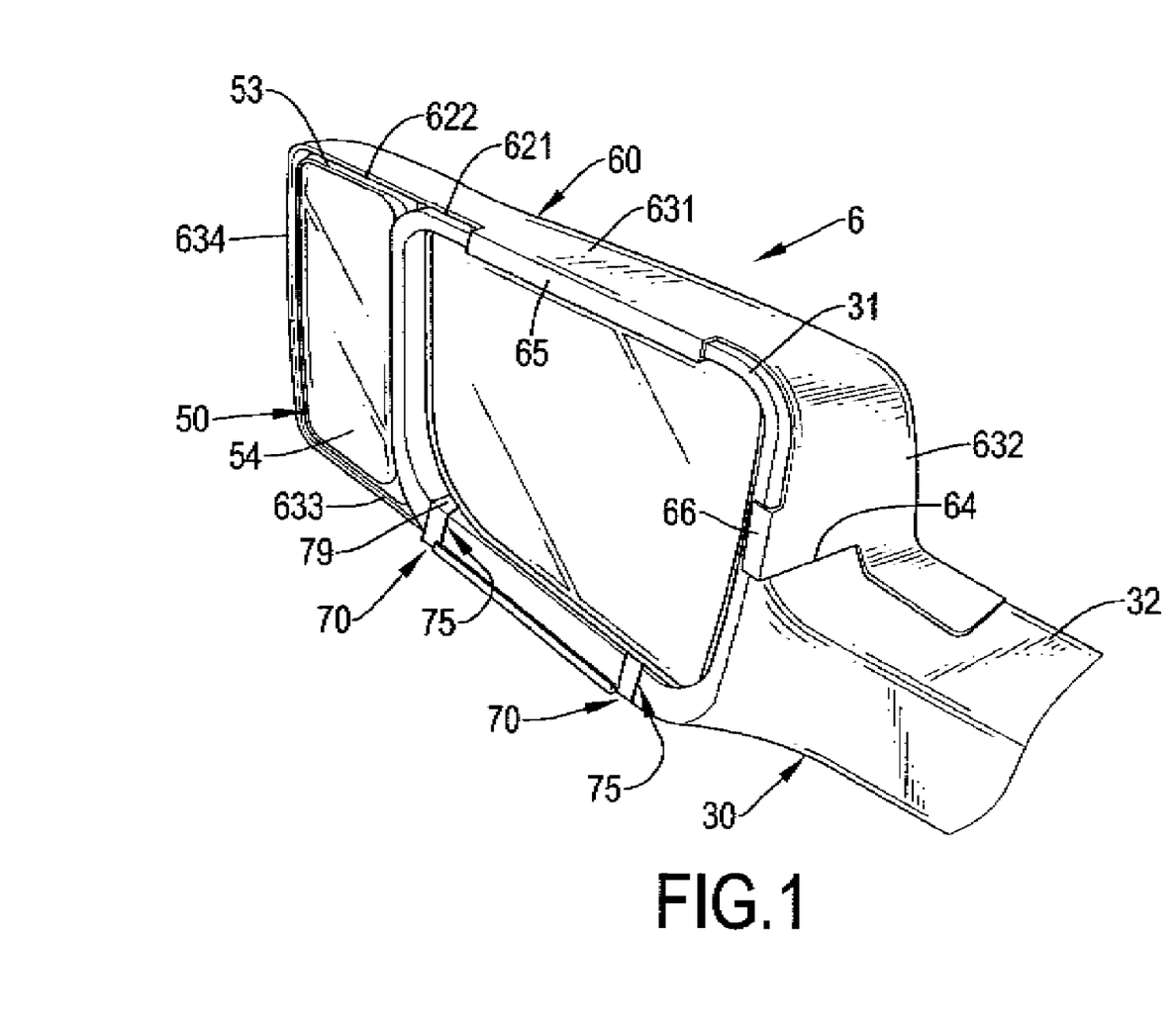
FIG. 1 is a perspective view of a first embodiment of an auxiliary accessory in accordance with the present invention mounted on a vehicle rearview mirror.
Figure 4:
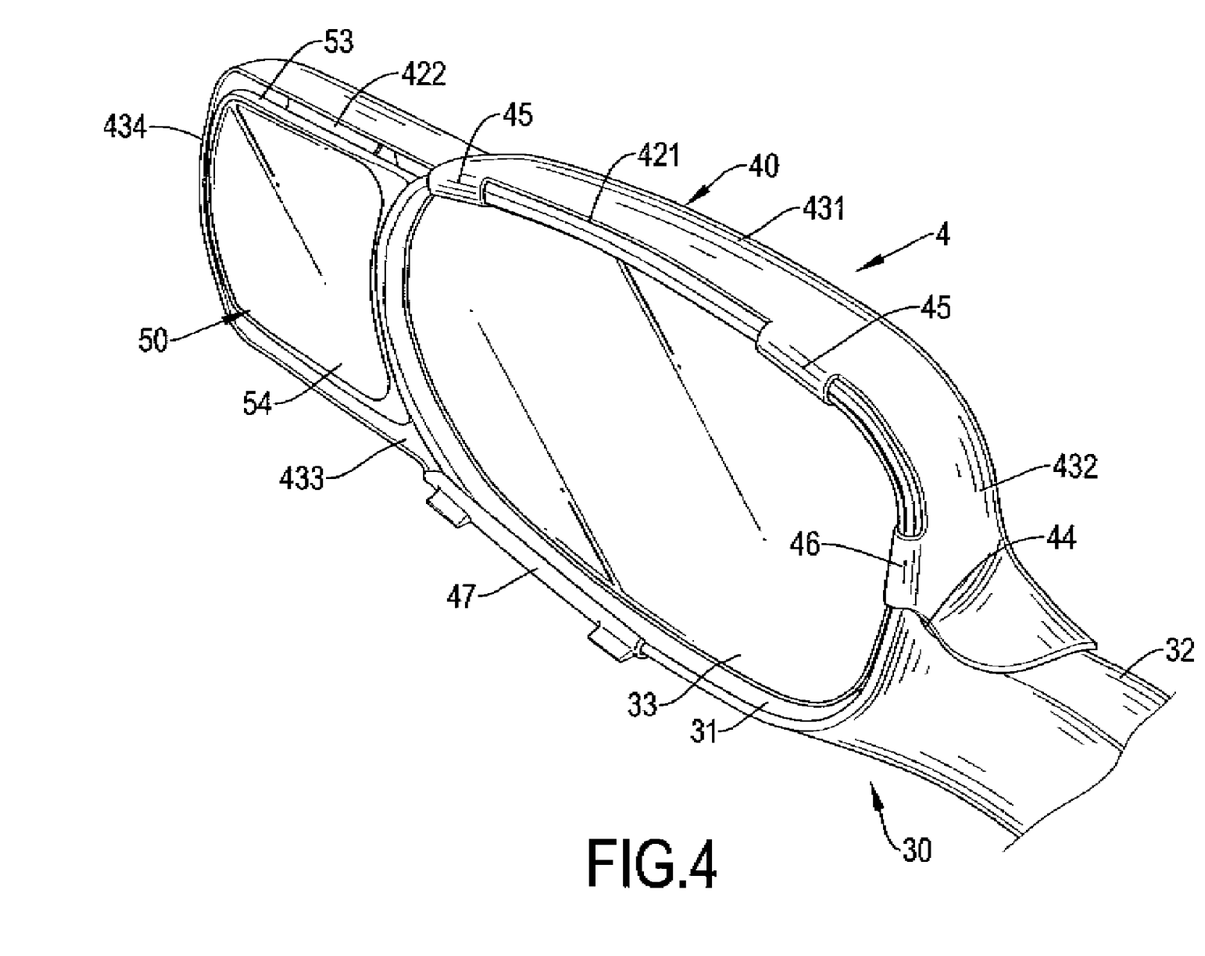
FIG. 4 is a perspective view of a second embodiment of an auxiliary accessory in accordance with the present invention mounted on a vehicle rearview mirror.

When assembling the auxiliary accessory (4, 6) on the vehicle rearview mirror (30), a user only needs to mount the cover (40, 60) around the vehicle rearview mirror (30) to make the mounting gap (44, 64) mounting around the linking segment (32) and holding the casing (31) inside the first mounting recess (421, 621) of the body (41, 61). Then, the retaining tabs (45, 46, 47, 65, 66, 67) on the sidewall of the body (41, 61) will engage the outer rim of the casing (31) to connect the body (41, 61) securely with the casing (31) to prevent the auxiliary accessory (4, 6) declining relative to or separating from the casing (31) when the vehicle is driving on the road and a shaking force is applied to the vehicle rearview mirror (30). When the cover (40, 60) holds the casing (31) of the vehicle rearview mirror (30) inside, the auxiliary mirror assembly (50) that is mounted in the second mounting recess (422, 622) is adjacent to the mirror (33) to increase the viewing range of the vehicle rearview mirror (30).

Furthermore, the body (61) of the cover (60) and the casing (31) of the vehicle rearview mirror (30) can be further secured with the clamping device (70). Thus, the auxiliary accessory (6) can be mounted on the vehicle rearview mirror (30) firmly by the at least one clamping device (70).

The auxiliary accessory (4, 6) as described has the following advantages.

1. The cover (40, 60) of the auxiliary accessory (4, 6) is fully mounted around the casing (31) of the vehicle rearview mirror (30) and this can provide an artistic effect and a protecting effect to prevent the vehicle rearview mirror (30) from damaging.

2. The retaining tabs (45, 46, 47, 65, 66, 67) that are formed on the sidewall of the body (41, 61) can engage the outer rim of the casing (31) to make the body (41, 61) connecting securely with the casing (31). Accordingly, the auxiliary accessory (4, 6) can be prevented from declining relative to or separating from the casing (31) when the vehicle is driving on the road and a shaking force is applied to the vehicle rearview mirror (30).

3. The at least one clamping device (70) of the auxiliary accessory (6) can provide a further combining effect to the cover (60) and the casing (31) of the vehicle rearview mirror (30). Accordingly, the auxiliary accessory (6) can be kept from declining relative to or separating from the casing (31).

Even though numerous characteristics and advantages of the present invention have been set forth in the foregoing description, together with details of the structure and features of the utility model, the disclosure is illustrative only.

Changes may be made in the details, especially in matters of shape, size, and arrangement of parts within the principles of the invention to the full extent indicated by the broad general meaning of the terms in which the appended claims are expressed.

What is claimed is:

1. An auxiliary accessory for a vehicle rearview mirror having a linking segment with an outer end, a casing formed on the outer end of the linking segment with an outer rim and a mirror mounted in the casing, and the auxiliary accessory having
   a cover being adapted to detachably mount on the casing of the vehicle rearview mirror and having
      a body having
         a shape being adapted to correspond to the casing of the vehicle rearview mirror;
         a face;
         a sidewall;
         a bottom;
         an inner end;
         an outer end;
         an opening being formed through the face of the body;
         a first mounting recess being defined in the body near the inner end and communicating with the opening to hold the casing of the vehicle rearview mirror inside; and
         a second mounting recess being defined in the body near the outer end and communicating with the opening and the first mounting recess;
         a mounting gap being formed through the inner end of the body and communicating with the first mounting recess to mount around the linking segment of the vehicle rearview mirror; and
         multiple retaining tabs being formed on and protruding from the sidewall of the body near the opening around the first mounting recess and the mounting gap to engage the outer rim of the casing of the vehicle rearview mirror;
   an auxiliary mirror assembly being detachably connected to the cover and having an auxiliary mirror mounted in the second mounting recess of the body to increase the viewing range of the vehicle rearview mirror; and
   at least one clamping device being clamped to the body of the cover with the casing of the vehicle rearview mirror and each one of the at least one clamping device having
      a joining mount being mounted on the bottom of the body near the opening and having
         a top being mounted securely on the bottom of the body;
         a bottom;
         a joining hole being formed through the top and the bottom of the joining mount; and
         an inserting hole being transversely formed through the joining mount near the top and communicating with the joining hole;
      a control element being mounted in the joining hole of the joining mount and having
         an engaging end being mounted in the joining hole of the joining mount near the opening of the body and having an inner face;
         a pressing end being formed with the engaging end and extending out of the joining hole of the joining mount; and
         a holding hook being formed on and protruding from the inner face of the engaging end of the control element; and
      a clamping frame being U-shaped, being connected to the joining mount to clamp with the casing of the vehicle rearview mirror and having
         a clamping end being inserted into the inserting hole of the joining mount and having a bottom faced to the holding hook of the control element;
         a middle being formed with the clamping end of the clamping frame;
         a holding end being formed with the middle of the clamping frame opposite to the clamping end of the clamping frame to press against the casing of the vehicle rearview mirror; and
      multiple engaging grooves being formed on the bottom of the clamping end of the clamping frame, wherein the holding hook of the control element engages one of the engaging grooves to hold the clamping frame with the casing of the vehicle rearview mirror.

2. The auxiliary accessory for a vehicle rearview mirror as claimed in claim 1, wherein the auxiliary mirror assembly further has
   a mounting post being mounted in the second mounting recess of the body and having
      a free end; and
      a ball connector being formed on the free end of the mounting post;
   a mirror base being mounted around the mounting post in the second mounting recess of the body and having
      an inner face;
      an outer face;
      a mounting hole being formed through the faces of the mirror base and being mounted around the ball connector of the mounting post; and
      a slit being formed through the faces of the mirror base and communicating with the mounting hole,
   wherein the auxiliary mirror is mounted on the outer face of the mirror base.

3. The auxiliary accessory for a vehicle rearview mirror as claimed in claim 2, wherein the cover further has multiple spacers mounted in the first mounting recess of the body.

4. The auxiliary accessory for a vehicle rearview mirror as claimed in claim 1, wherein the cover further has multiple spacers mounted in the first mounting recess of the body.

5. An auxiliary accessory for a vehicle rearview mirror having a linking segment with an outer end, a casing formed on the outer end of the linking segment with an outer rim and a mirror mounted in the casing, and the auxiliary accessory having
   a cover being adapted to detachably mount on the casing of the vehicle rearview mirror and having
      a body having
         a shape being adapted to correspond to the casing of the vehicle rearview mirror;
         a face;
         a sidewall;
         a bottom;
         an inner end;
         an outer end;
         an opening being formed through the face of the body;
         a first mounting recess being defined in the body near the inner end and communicating with the opening to hold the casing of the vehicle rearview mirror inside; and
         a second mounting recess being defined in the body near the outer end and communicating with the opening and the first mounting recess;

a mounting gap being formed through the inner end of the body and communicating with the first mounting recess to mount around the linking segment of the vehicle rearview mirror; and multiple retaining tabs being formed on and protruding from the sidewall of the body near the opening around the first mounting recess and the mounting gap to engage the outer rim of the casing of the vehicle rearview mirror; and an auxiliary mirror assembly being detachably connected to the cover and having an auxiliary mirror mounted in the second mounting recess of the body to increase the viewing range of the vehicle rearview mirror, wherein the auxiliary mirror assembly further has a mounting post being mounted in the second mounting recess of the body and having a free end; and a ball connector being formed on the free end of the mounting post;

a mirror base being mounted around the mounting post in the second mounting recess of the body and having an inner face;

an outer face;

a mounting hole being formed through the faces of the mirror base and being mounted around the ball connector of the mounting post; and a slit being formed through the faces of the mirror base and communicating with the mounting hole, wherein the auxiliary mirror is mounted on the outer face of the mirror base.

* * * * *